(12) United States Patent
Hoppe et al.

(10) Patent No.: US 12,266,883 B2
(45) Date of Patent: Apr. 1, 2025

(54) MODULAR HIGH-CURRENT CONNECTOR

(71) Applicant: HARTING Electric Stiftung & Co. KG, Espelkamp (DE)

(72) Inventors: Nando Hoppe, Nienstaedt (DE); Benjamin Krüger, Espelkamp (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 316 days.

(21) Appl. No.: 17/798,402

(22) PCT Filed: Mar. 8, 2021

(86) PCT No.: PCT/DE2021/100233
§ 371 (c)(1),
(2) Date: Aug. 9, 2022

(87) PCT Pub. No.: WO2021/185406
PCT Pub. Date: Sep. 23, 2021

(65) Prior Publication Data
US 2023/0094585 A1    Mar. 30, 2023

(30) Foreign Application Priority Data
Mar. 18, 2020 (DE) .................. 10 2020 107 393.3

(51) Int. Cl.
*H01R 13/514* (2006.01)
*G01K 11/12* (2021.01)
(Continued)

(52) U.S. Cl.
CPC ........... *H01R 13/514* (2013.01); *G01K 11/12* (2013.01); *H01R 13/03* (2013.01); *H01R 13/521* (2013.01); *H01R 13/53* (2013.01)

(58) Field of Classification Search
CPC .... H01R 13/514; H01R 13/03; H01R 13/521; H01R 13/53; G01K 11/12
(Continued)

(56) References Cited

U.S. PATENT DOCUMENTS

2012/0244755 A1* 9/2012 Suzuki ................... H01R 13/64
439/660
2013/0323954 A1* 12/2013 Eckel ................. H01R 13/5219
439/271
(Continued)

FOREIGN PATENT DOCUMENTS

| CN | 1144979 A | * | 3/1997 | |
|---|---|---|---|---|
| CN | 110546346 A | * | 12/2019 | .......... E21B 43/1185 |

(Continued)

OTHER PUBLICATIONS

Norbert Kropiewnicki et al., co-pending U.S. Appl. No. 17/798,478, filed Aug. 9, 2022, national phase entry of PCT/DE20211/00234.

*Primary Examiner* — Peter G Leigh
(74) *Attorney, Agent, or Firm* — Smartpat PLC

(57) ABSTRACT

A modular high-current connector (1) has a first housing part (7) and a second housing part (8) connected thereto. The high-current connector (1) has a pin contact (9), the pin contact (9) being substantially cylindrical and having a connection region (A') and a contact region (K') for making electrical contact with a device socket or a mating connector. The contact region (K') of the pin contact (9) projects out of the high-current connector (1) on the plug-in side.

18 Claims, 4 Drawing Sheets

(51) Int. Cl.
  *H01R 13/03* (2006.01)
  *H01R 13/52* (2006.01)
  *H01R 13/53* (2006.01)

(58) Field of Classification Search
  USPC ........................................................ 439/488
  See application file for complete search history.

(56) References Cited

U.S. PATENT DOCUMENTS

| | | | |
|---|---|---|---|
| 2018/0299239 A1* | 10/2018 | Eitschberger | H05K 5/069 |
| 2018/0309227 A1* | 10/2018 | Diessel | H01R 13/73 |
| 2021/0143583 A1* | 5/2021 | Zhang | H01R 43/02 |
| 2021/0210887 A1 | 7/2021 | Kliever | |
| 2022/0037835 A1* | 2/2022 | Kliever | H01R 13/6315 |

FOREIGN PATENT DOCUMENTS

| | | | | |
|---|---|---|---|---|
| CN | 110707456 A | * | 1/2020 | ............ H01R 13/03 |
| DE | 1983593 U | | 4/1968 | |
| DE | 102016115678 A1 | | 3/2018 | |
| DE | 102018127720 | | 12/2019 | |
| DE | 102018127720 B3 | * | 12/2019 | ............ H01R 13/17 |
| WO | WO-2019205115 A1 | * | 10/2019 | ............... G01K 1/06 |
| WO | 2019219126 A1 | | 11/2019 | |

\* cited by examiner

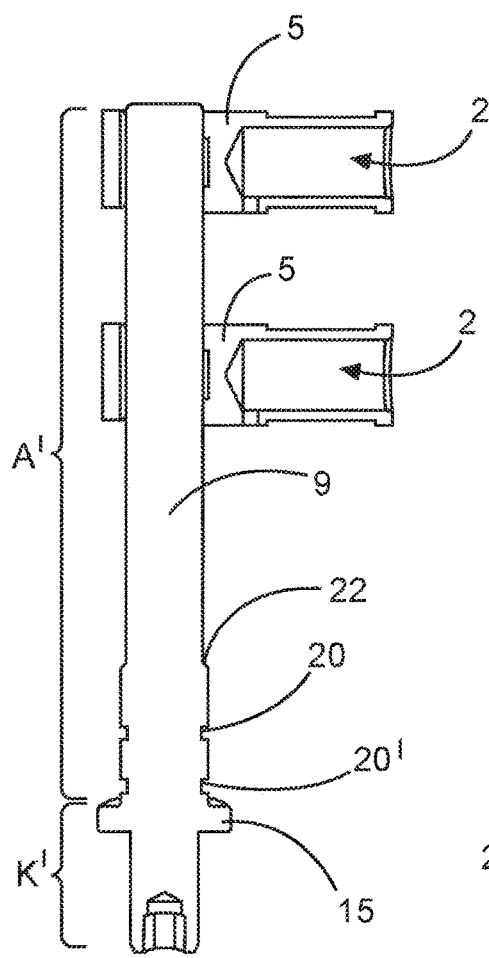
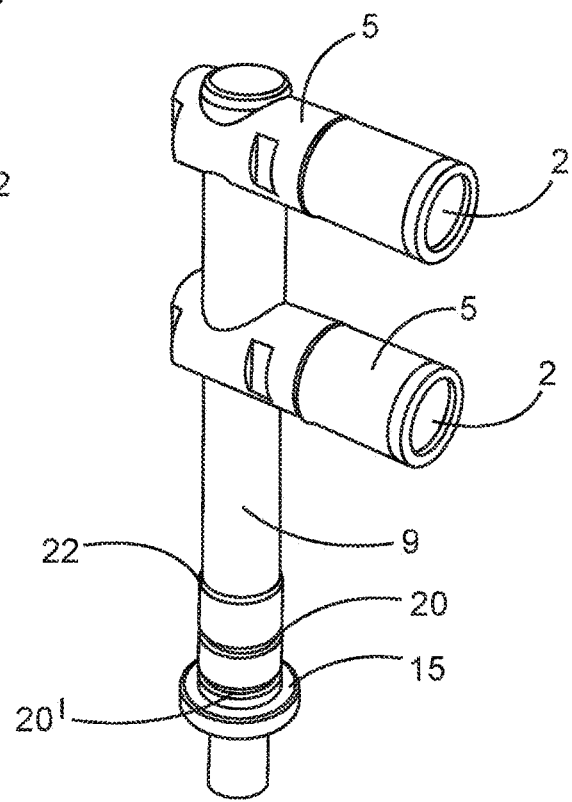
Fig. 3　　　　Fig. 4
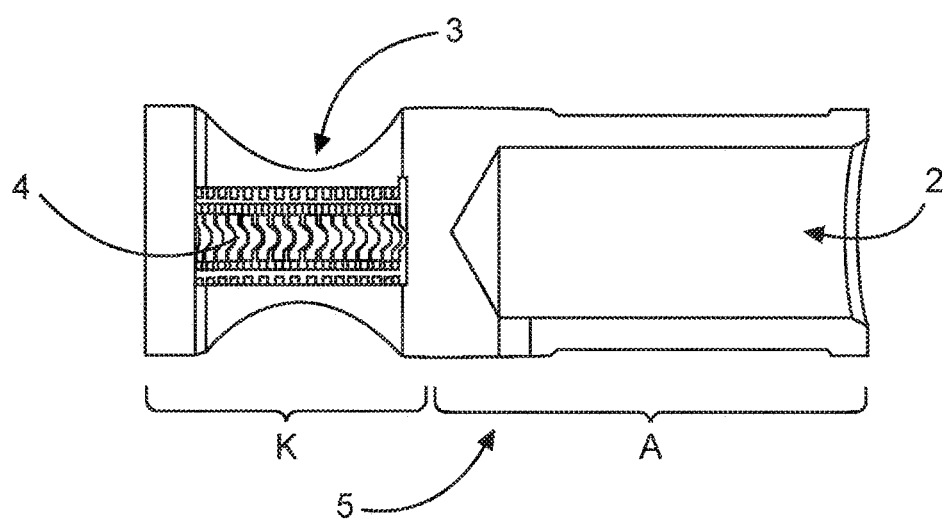
Fig. 5

MODULAR HIGH-CURRENT CONNECTOR

TECHNICAL FIELD

The disclosure relates to a modular high-current connector. Such high-current connectors are used for high-current applications and in particular for supplying power to transformers.

BACKGROUND

DE 1 983 593 U1 discloses a high-current connector. Due to the cable outlet running parallel to the plug-in direction, a lot of space is required when installing such connectors.

The German Patent and Trade Mark Office has searched the following prior art in the priority application for the present application: DE 10 2018 127 720 B3 and DE 10 2016 115 678 A1.

SUMMARY

An object of the disclosure is to propose a high-current connector that can be produced inexpensively and installed in a space-saving and simple manner.

This object is achieved by the subject matter of the independent claims.

Advantageous embodiments of the invention are specified in the dependent claims and the following description.

The high-current connector has a first housing part and a second housing part connected thereto. The connection of the two housing parts can be realized via a screw connection.

A pin contact is held in the first housing part. The pin contact is substantially cylindrical and has a connection region and a contact region for establishing electrical contact with a device socket or a mating connector. The first housing part forms the plug-in region or the plug-in side of the high-current connector. The contact pin therefore forms the contacting means for a socket, for example a transformer socket. For this purpose, the contact region of the pin contact protrudes from the high-current connector on the plug-in side.

Advantageously, the high-current connector has at least one insulating body, which is at least partially arranged in the first housing part or held by it. The insulating body protrudes from the first housing part on the plug-in side.

In the plugged state, the insulating body reaches through the device wall or the housing wall of the transformer housing. The device housing or transformer housing may be at least partially filled with oil or comparable lubricants. It is therefore advantageous if the pin contact has two circumferential grooves, in each of which there is arranged a ring seal. This protects the high-current connector on the plug-in side against the ingress of undesirable media (oil, water, dust, etc.).

Advantageously, the insulating body at least partially encloses the pin contact. The insulating body preferably runs from the circumferential ring against the plug-in direction into the connection region of the pin contact. However, the connection region is not completely enclosed by the insulating body, as space is still required here for the electrical contacting of at least one connection contact element.

A connection contact element for electrical connection to a line to be connected is preferably arranged in the second housing part. The second housing part has an open housing wall. This open housing side can be closed via a housing cover. However, the housing wall at the same time forms the connection point for fixing a further housing part.

Preferably, it is possible to equip the modular high-current connector with a third housing part. The third housing part is fixed to the second housing part. A screw connection is preferably used for this purpose. Analogously to the second housing part, a further connection contact element is arranged in the third housing part for electrical connection to a further line to be connected.

It is possible to equip the modular high-current connector with further housing parts, i.e., a fourth, a fifth and/or a sixth housing part. In each of these housing parts, there is arranged a connection contact element for electrical connection to a further line to be connected. The housing parts are arranged one behind the other and fixed to each other. The third housing part is then fixed to the second housing part, the fourth housing part is fixed to the third housing part, and so on. The last housing part is closed via the above-mentioned housing cover, so that the high-current connector or its housing is closed and media-tight as a whole. This allows the high-current connector to be extended as required. The same components can be used for this purpose.

Electrical lines are connected to the individual connection contact elements. Preferably, the various connection contact elements are electrically conductively connected to the pin contact. Higher currents can be transmitted via the pin contact over a plurality of lines connected in parallel. For example, with one line the high-current connector can transmit 400A, with two lines 800A, and with three lines correspondingly 1200A. The high-current connector can be extended as required and thus adapted to different fields of application.

In a particularly advantageous embodiment, the connection contact elements each have a connection region and a contact region. The electrical lines are connected to the connection region. This is achieved via a crimp connection. For this purpose, the connection region has a cylindrical opening. A crimp connection offers a high level of protection against vibration. This type of connection technology is therefore very popular, particularly in the rail sector. The contact region of the connection contact element has a cylindrical through-opening. For electrical contacting of the connection contact elements, the pin contact is inserted into the through-openings of the connection contact elements. The diameters of the pin contact and the individual through-openings are matched to each other for this purpose.

Preferably, the opening or the crimp opening and the through-opening of the corresponding connection contact element are oriented orthogonally to each other. As a result, the connection direction of the lines and the plug-in direction of the high-current connector also run orthogonally to each other. The lines run flat away from the connected device, which is particularly advantageous in the rail sector, as the lines run flat against a rail wall and can thus be laid in a space-saving manner.

To ensure optimum electrical contact between the connection contact element and the pin contact, a circumferential contact strip is preferably arranged inside the cylindrical through-opening of the connection contact element in question.

Preferably, the pin contact is substantially cylindrical and has a connection region and a contact region. The connection region forms the electrical contact described above between the pin contact and the connection contact elements. The contact region forms the electrical contact to a device socket or connection socket.

The contact region of the pin contact has a circumferential thread. In addition, the contact region of the pin contact has a circumferential ring. Or, in other words, the circumferential thread runs starting from the circumferential ring in the plug-in direction of the pin contact. The circumferential thread can run to the contact tip of the pin contact. This makes it possible to contact the pin contact with a so-called cable lug, which is pressed against the circumferential ring on the plug-in side by a nut screwed onto the thread. Such contacting has proven to be particularly durable and extremely resistant to vibration. This contacting technique is therefore particularly suitable for the rail sector.

Preferably, the pin contact has an axial opening in the contact region, which serves, for example, as a receptacle for a so-called Allen key. This allows the contact pin to be fixed in place when the lock nut for the cable lug is tightened.

It is advantageous if at least one housing part comprises a thermochromic element or consists of such a material. The thermochromic element or the thermochromic material is designed to visually indicate an overloading of the high-current connector. This can be achieved, for example, by a change in the color of the element or material. In this way, overloaded connectors can be quickly identified.

BRIEF DESCRIPTION OF THE DRAWINGS

An exemplary embodiment of the invention is shown in the drawings and is explained in more detail below.

FIG. 3 shows a sectional view of a pin contact which is in electrical contact with two connection contact elements, FIG. 4 shows a perspective view of a pin contact which is in electrical contact with two connection contact elements, FIG. 5 shows a sectional view of a connection contact element.

DETAILED DESCRIPTION

The figures contain partially simplified, schematic representations. Identical reference signs are sometimes used for like but possibly non-identical elements. Different views of like elements might be scaled differently.

Directional indications such as "left", "right", "top" and "bottom" are to be understood with reference to the figure in question and may vary in the individual representations with respect to the object depicted.

Figure 1:
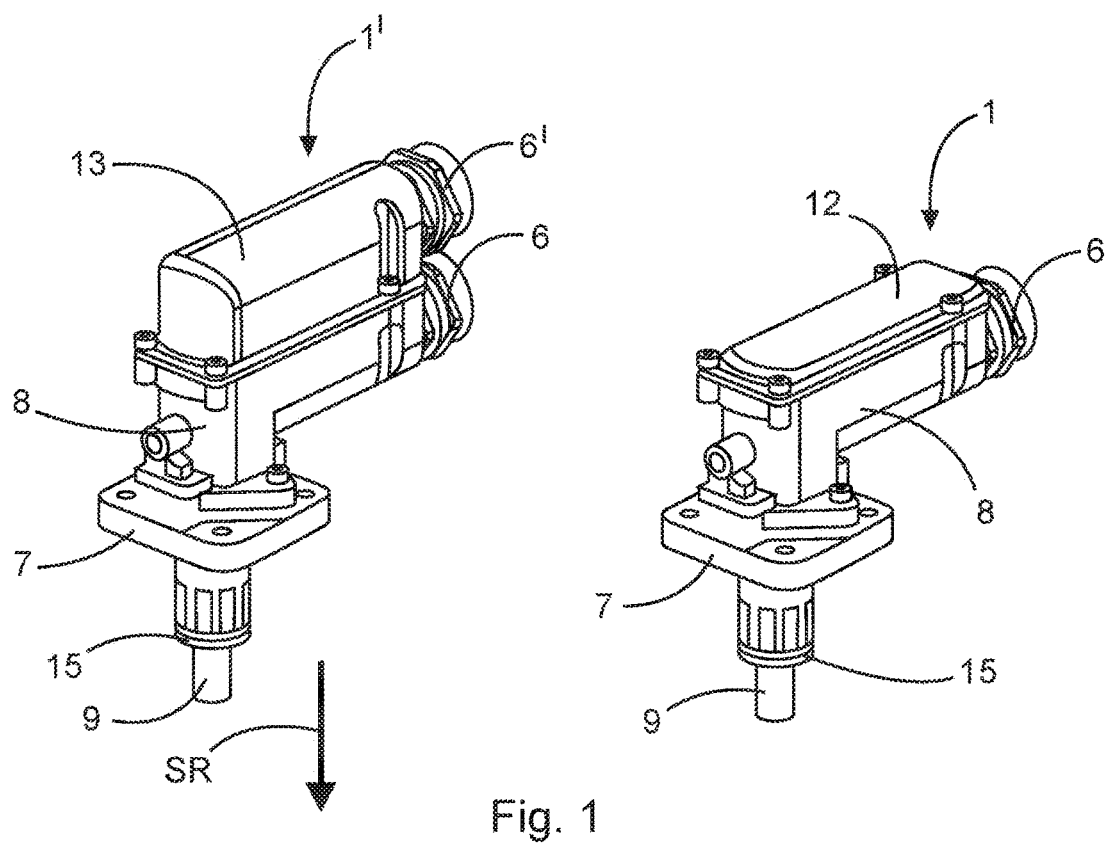
FIG. 1 shows a perspective view of two high-current connectors.
Figure 2:
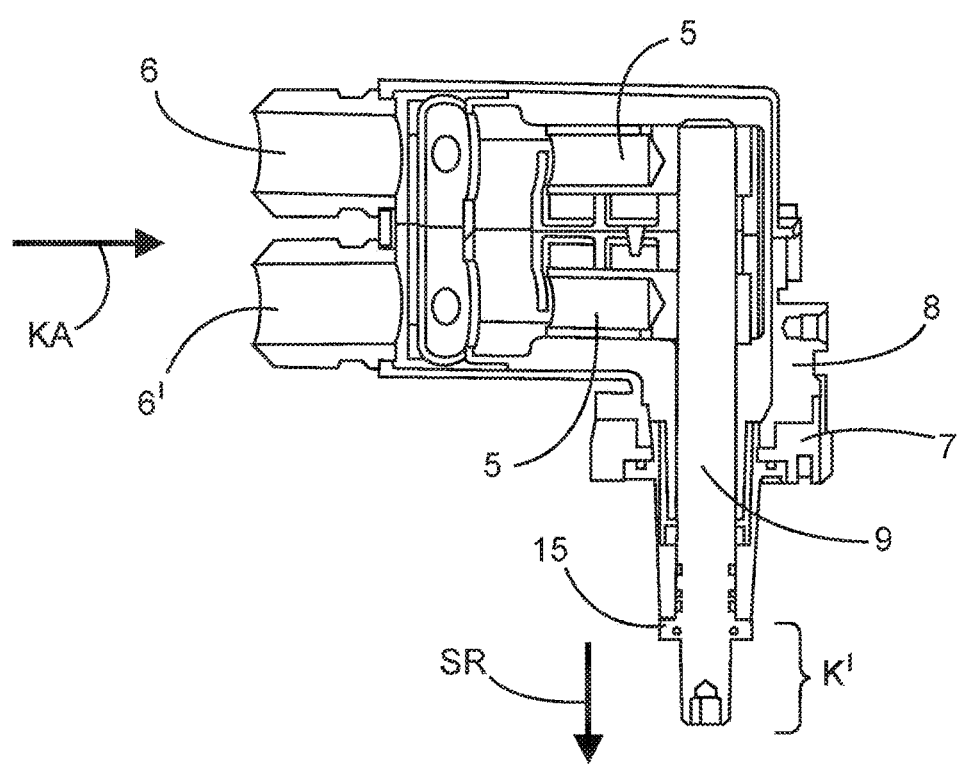
FIG. 2 shows a lateral sectional view of a high-current connector.

FIG. 1 shows a perspective view of two high-current connectors 1, 1'. In the smaller version of the high-current connector 1, one electrical line (not shown) is connected. In the larger version 1', two electrical lines are connected. The larger version of the high-current connector 1' is thus capable of transmitting a higher amperage. FIG. 2 shows a sectional view of the larger high-current connector version 1'. The electrical lines connected to the high-current connector 1, 1' are fixed via a cable gland 6, 6'.

The high-current connector 1, 1' has a first housing part 7, in which there is arranged a pin contact 9. The pin contact 9 can be seen in detail in FIGS. 3 and 4. The pin contact 9 has a contact region K' and a connection region A'. The contact region K' of the pin contact 9 protrudes from the first housing part 7 on the plug-in side and forms the electrical contact with a device socket (not shown) in the plugged state.

The pin contact 9 protrudes with its connection region A' into a second housing part 8 of the high-current connector 1, 1'. Here, the pin contact 9 is in electrically conductive contact with at least one connection contact element 5. An electrical line (not shown) is connected to each connection contact element 5 using crimping technology. The pin contact 9 and the connection contact element 5 or their main axes of symmetry are oriented orthogonally to each other. As a result, the plug-in direction and the cable connection direction of the high-current connector are also perpendicular to each other.

Figure 6:
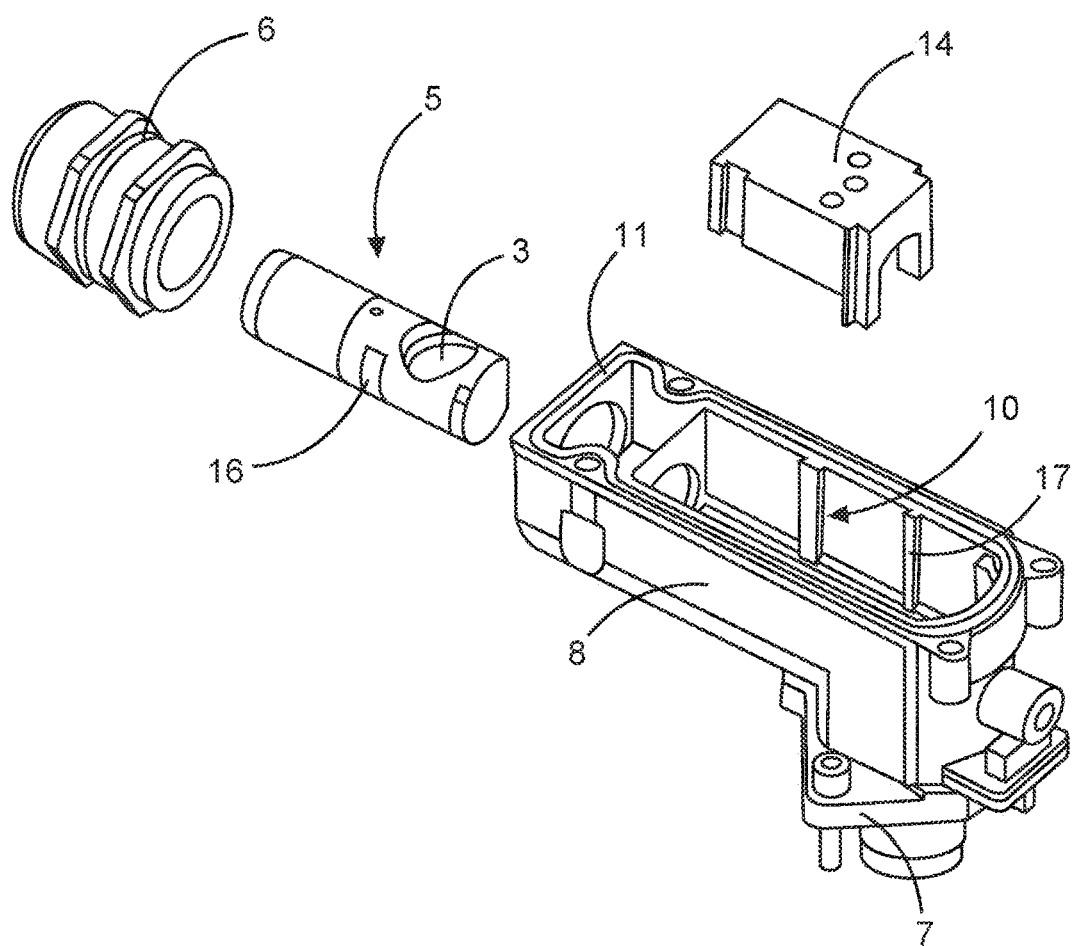
FIG. 6 shows an exploded view of a high-current connector.

In FIG. 6 it can be seen that the second housing part 8 has an open housing wall 10. The edge of the open housing wall 10 is provided with a circumferential groove 11, in which a seal (not shown) is inserted for media sealing of the high-current connector 1, 1'. The open housing wall 10 can be closed via a housing cover 12. For modular expansion of the high-current connector 1', a further housing part, namely a third housing part 13, can be fitted on the open housing wall 10.

FIG. 2 shows that the third housing part 13 is also provided with a connection contact element 5, which can be provided on the connection side with a further connected line (not shown) and is electrically contacted on the contact side with the pin contact 9.

FIG. 5 shows a sectional view of a connection contact element 5. The connection contact element has a groove 16 on both sides. In the second housing part 8, integrally molded ribs 17 engage in these grooves 16, thus ensuring that the connection contact element is prevented from rotating. The connection contact element 5 is fixed in the second housing part 8 via a fixing means 14. The same fixing element 14 can of course also be used for other housing parts, for example a third housing part 13.

The connection contact element 5 has a connection region A and a contact region K. The connection region A has a cylindrical opening 2, which is provided for a crimp connection to an electrical line to be connected. The contact region K of the connection contact element 5 has a cylindrical through-opening 3. For the electrical connection between the connection contact element 5 and the pin contact 9, the pin contact 9 is inserted into this through-opening 3. A contact strip 4 is arranged inside the through-opening 3 and ensures reliable electrical contact between the connection contact element 5 and the pin contact 9.

The main axes of symmetry of the crimp opening 2 and the through-opening 3 are oriented orthogonally to each other. As a result, the plug-in direction SR and cable connection direction KA of the high-current connector 1, 1' are oriented perpendicular to each other. The lines thus run flat away from the device, thereby allowing easy line routing or laying.

The contact region K' of the pin contact 9 is closed off by a circumferential ring 15. Starting from the circumferential ring 15 in the direction of its contact tip, the contact pin 9 has a circumferential thread 18. When connecting the high-current connector 1, 1' to a transformer, for example, an annular cable lug (not shown) is guided around the contact tip of the contact pin 9. Via at least one threaded screw (not shown), the cable lug is fixed and thereby pressed against the ring surface of the circumferential ring 15. Preferably, a second threaded screw or lock nut is used here to ensure optimum protection against vibration.

Figure 7:
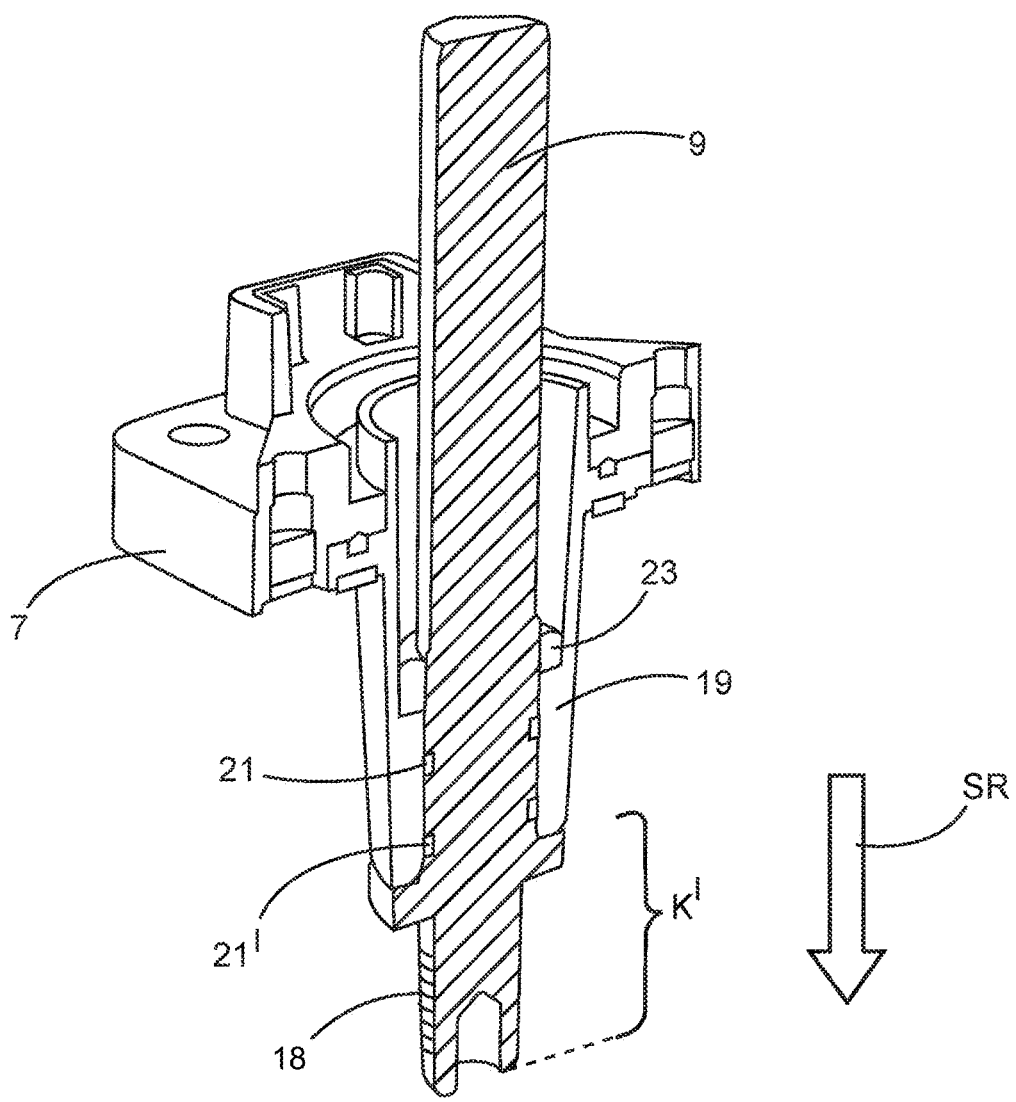
FIG. 7 shows a perspective sectional view of the first housing part of the high current connector.

FIG. 7 shows a perspective sectional view of the first housing part 7 of the high-current connector 1. The contact pin 9 is oriented in such a way that it protrudes with its contact region K' from the insulating body 19 in the plug-in direction SR. The insulating body 19 runs above the circumferential ring—against the plug-in direction SR—to the first housing part 7 of the high-current connector 1. In this case, the insulating body 19 protrudes from the first housing part 7 and is held by the first housing part 7 only in its upper region. This freely running part of the insulating body 19 later protrudes into a device wall or into the transformer housing.

The contact pin 9 has two circumferential grooves 20, 20' in the region that runs inside the insulating body 19. Ring seals 21, 21' are inserted one in each of these grooves 20, 20'. This provides the high-current connector 1 with a media-tight seal on the plug-in side.

The contact pin 9 protrudes—against the plug-in direction SR—out of the first housing part 7 into at least one second housing part 8 and possibly also into a third housing part 13. In this region, the above-mentioned connection contact elements 5 are connected to the pin contact 9.

The contact pin 9 has a shoulder 22 in the connection direction. Via this shoulder 22, the pin contact 9 can be fixed or clamped in the first housing part 7 with the aid of a fixing means 23.

The pin contact 9 is preferably made of pure copper to ensure a corresponding current-carrying capacity. The term 'pure copper' means that the material has a copper content of at least 99 percent by weight. The connection contact element or the connection contact elements can also consist of such pure copper.

Even though various aspects or features of the invention are each shown in combination in the figures, it is apparent to a person skilled in the art—unless otherwise indicated—that the combinations shown and discussed are not the only possible ones. In particular, corresponding units or feature combinations from different exemplary embodiments may be interchanged with each other.

LIST OF REFERENCE SIGNS 1 high-current connector
2 opening
3 through-opening
4 contact strip
5 connection contact element
6 cable gland
7 first housing part
8 second housing part
9 pin contact
10 open housing wall
11 groove
12 housing cover
13 third housing part
14 fixing means
15 circumferential ring
16 groove
17 rib
18 thread
19 insulating body
20 groove
21 ring seal
22 shoulder
23 fixing means
A, A' connection region
K, K' contact region
KA cable connection direction
SR plug-in direction

The invention claimed is:

1. A modular high-current connector (1), comprising:
   a first housing part (7);
   an insulating body (19) which is arranged in part in the first housing part (7) and which protrudes from the first housing part (7) on a plug-in side;
   a second housing part (8) connected to the first housing part (7); and
   a substantially cylindrical pin contact (9),
   wherein the pin contact (9) has
      a connection region (A') and
      a contact region (K'),
   wherein the contact region (K') of the pin contact (9) protrudes from the high-current connector (1) on the plug-in side for establishing electrical contact with a device socket or a mating connector.

2. The modular high-current connector (1) as claimed in claim 1,
   wherein the contact region (K') of the pin contact (9) has
      a circumferential ring (15) and
      a circumferential thread (18), and
   wherein the circumferential thread (18) runs in a plug-in direction (SR) of the pin contact (9) starting from the circumferential ring (15).

3. The modular high-current connector (1) as claimed in claim 2,
   wherein the insulating body (19) encloses the pin contact (9) against the plug-in direction (SR) starting from the circumferential ring (15).

4. The modular high-current connector (1) as claimed in claim 1,
   wherein the connection region (A') of the pin contact (9) is at least partially enclosed by the insulating body (19).

5. The modular high-current connector (1) as claimed in claim 1,
   wherein the pin contact (9) has two circumferential grooves (20, 20'), in each of which there is arranged a ring seal (21) for sealing the pin contact (9) within the insulating body (19).

6. The modular high-current connector (1) as claimed in claim 1,
   wherein the high-current connector has at least one connection contact element (5) for establishing an electrical connection to a line to be connected, and
   wherein the connection contact element (5) or the connection contact elements (5) are each electrically conductively connected to the pin contact (9).

7. The modular high-current connector (1) as claimed in claim 6,
   wherein the connection contact element or the connection contact elements consist of pure copper.

8. The modular high-current connector (1) as claimed in claim 1,
   wherein the second housing part (8) has an open housing wall (10) which is closable by means of a housing cover (12) or to which a further housing part is fixable.

9. The modular high-current connector (1) as claimed in claim 1,
   wherein the modular high-current connector (1) has a third housing part (13).

10. The modular high-current connector (1) as claimed in claim 1,
   wherein all housing parts consist of an aluminum die-cast material.

11. The modular high-current connector (1) as claimed in claim 1,
   wherein the insulating body (19) consists of polyamide.

12. The modular high-current connector (1) as claimed in claim 1,
wherein the pin contact (9) consists of pure copper.

13. The modular high-current connector (1) as claimed in claim 1,
wherein the first housing part (7) and the second housing part (8) connected thereto are embodied in one part.

14. The modular high-current connector (1) as claimed in claim 1,
wherein at least one housing part has a thermochromic element.

15. The modular high-current connector (1) as claimed in claim 14,
wherein the thermochromic element is designed to visually indicate an overloading of the high-current connector (1).

16. The modular high-current connector (1) as claimed in claim 1,
wherein the pin contact (9) has an axial opening in an end face of the contact region (K'), the axial opening being configured to receive an Allen key.

17. A modular high-current connector (1), comprising:
a first housing part (7);
a second housing part (8) connected to the first housing part (7);
a third housing part (13); and
a substantially cylindrical pin contact (9), wherein the substantially cylindrical pin contact (9) has
a connection region (A') and
a contact region (K'),
wherein the contact region (K') of the substantially cylindrical pin contact (9) protrudes from the high-current connector (1) on a plug-in side for establishing electrical contact with a device socket or a mating connector
wherein the modular high-current connector (1) has further housing parts comprising a fourth housing part, a fifth housing part, and a sixth housing part, and
wherein the further housing parts are embodied similarly to the third housing part (13).

18. The modular high-current connector (1) as claimed in claim 17,
wherein a connection contact element (5) is arranged in each case in the second housing part (8) and/or in the third housing part (13) and/or in the fourth housing part and/or in the fifth housing part and/or in the sixth housing part.

* * * * *